US012215879B2

(12) United States Patent
Ho et al.

(10) Patent No.: US 12,215,879 B2
(45) Date of Patent: Feb. 4, 2025

(54) THERMOSTATIC RADIATOR VALVE (TRV) CONFIGURABLE DISPLAY

(71) Applicant: Computime Ltd., New Territories (HK)

(72) Inventors: Kam Wai Raymond Ho, Hong Kong (CN); Kam Yuen Lam, Hong Kong (CN); Rui Feng Li, Enping (CN); Siu Fung Liu, Hong Kong (CN); Fai Keung Seto, Hong Kong (CN); Wai Yin Shum, Hong Kong (CN); Chi Ming So, Hong Kong (CN)

(73) Assignee: Computime Ltd., New Territories (HK)

( * ) Notice: Subject to any disclaimer, the term of this patent is extended or adjusted under 35 U.S.C. 154(b) by 10 days.

(21) Appl. No.: 17/987,127

(22) Filed: Nov. 15, 2022

(65) Prior Publication Data
US 2023/0204242 A1 Jun. 29, 2023

Related U.S. Application Data

(60) Provisional application No. 63/293,281, filed on Dec. 23, 2021.

(51) Int. Cl.
*F24F 11/523* (2018.01)
*F24F 11/84* (2018.01)
(Continued)

(52) U.S. Cl.
CPC ............ *F24F 11/523* (2018.01); *F24F 11/84* (2018.01); *F24F 2140/00* (2018.01); *G01P 15/18* (2013.01);
(Continued)

(58) Field of Classification Search
CPC ...... F24F 11/523; F24F 11/84; F24F 2140/00; G01P 15/18; G09G 3/12; G09G 3/18; G09G 3/20; G09G 2340/0492
(Continued)

(56) References Cited

U.S. PATENT DOCUMENTS

2007/0158442 A1 7/2007 Chapman et al.
2015/0219357 A1* 8/2015 Stefanski ........... G05D 23/1902
236/1 C
(Continued)

FOREIGN PATENT DOCUMENTS

CN 105867448 A 8/2016
DE 202010007399 U1 9/2010
(Continued)

OTHER PUBLICATIONS

Knie Ingmar et al. Valve Controller In Combination With An Energy Harvester May 7, 2014 Honeywell Technologies SarlGB 2507555 A pp. 1-10 figures 1-2.*

(Continued)

*Primary Examiner* — Prabodh M Dharia
(74) *Attorney, Agent, or Firm* — Banner & Witcoff, Ltd.

(57) ABSTRACT

A thermostatic radiator valve supports a display that is configurable to display TRV information for a desired viewing direction to facilitate reading by a user, where the TRV comprises a configurable electronic display, a configuration circuit, and a processing device. The configuration circuit is capable of detecting when the TRV has been installed, determining a desired display orientation from a plurality of orientations with respect to a designated surface via a sensor in response to the detecting, and generating a display indicator indicative of the desired display orientation. The processing device is capable of receiving the display indicator and configuring the configurable electronic display to display the TRV information in the desired display orientation.

23 Claims, 12 Drawing Sheets

(51) Int. Cl.
  *F24F 140/00*    (2018.01)
  *G01P 15/18*    (2013.01)
  *G09G 3/18*    (2006.01)

(52) U.S. Cl.
  CPC ....... *G09G 3/18* (2013.01); *G09G 2340/0492* (2013.01)

(58) Field of Classification Search
  USPC .......................................................... 345/659
  See application file for complete search history.

(56) References Cited

U.S. PATENT DOCUMENTS

| | | | | |
|---|---|---|---|---|
| 2016/0327298 | A1* | 11/2016 | Sinha | F24F 11/63 |
| 2017/0336088 | A1* | 11/2017 | Hynes | F24F 11/46 |
| 2018/0032043 | A1* | 2/2018 | Matsuoka | F24D 19/1081 |
| 2018/0106500 | A1* | 4/2018 | Kraft | F24H 3/08 |
| 2018/0203475 | A1 | 7/2018 | Van Derven et al. | |
| 2019/0353380 | A1* | 11/2019 | Gillette | F24F 11/49 |

FOREIGN PATENT DOCUMENTS

| | | |
|---|---|---|
| DE | 202012011746 U1 | 1/2013 |
| DE | 102013100089 A1 | 7/2013 |
| DE | 102013105986 A1 | 12/2013 |
| DE | 102014111662 A1 | 2/2016 |
| EP | 3056825 A2 | 8/2016 |
| EP | 3339753 A1 | 6/2018 |
| EP | 3056825 B1 | 3/2019 |
| EP | 3318948 B1 | 5/2019 |
| EP | 3339754 B1 | 9/2020 |
| EP | 2988188 B1 | 2/2021 |
| EP | 3611592 B1 | 3/2021 |
| GB | 2452043 B | 10/2009 |
| GB | 2513524 B | 1/2018 |
| GB | 2498573 B | 8/2018 |
| NL | 2010955 C2 | 6/2015 |
| NL | 2010153 B1 | 4/2018 |
| WO | 2012068503 A1 | 5/2012 |

OTHER PUBLICATIONS

Gorman Derel et al. Thermostats And Thermostatic Radiator ValveDec. 22, 1993 Drayton Controls (Engineering) Ltd. GB 2267952 A pp. 1-9, figures 1-4.*
Smart Radiator Valves, https://www.netamo.com/en-eu/energy/valves, printed Nov. 30, 2022.
Genius LCD 100, Eurotronic Technology GmbH, https://eurotronic.org/produkte/elektronische-heizkoerperthermostate/genius-lcd-100/, printed Nov. 30, 2022.
Danfos Ally™ https://assets.danfoss.com/documents/44092/AI319043912283en-030102.pdf, 5 pages, printed Nov. 30, 2022.
Apr. 23, 2023 (EP) Extended European Search Report Appn 22210962.1.

* cited by examiner (Vertical Position)

(Horizontal – Outward Position)

(Horizontal – Left Position)

(Horizontal – Right Position)

THERMOSTATIC RADIATOR VALVE (TRV) CONFIGURABLE DISPLAY

This patent application claims priority to U.S. Provisional Patent Application No. 63/293,281 entitled "THERMOSTATIC RADIATOR VALVE (TRV) CONFIGURABLE DISPLAY" filed on Dec. 23, 2021, which is hereby incorporated by reference in its entirety.

TECHNICAL FIELD

Aspects of the disclosure relate to a configurable display of a thermostatic radiator valve (TRV) for controlling a heating, ventilation, and air conditioning (HVAC) system.

BRIEF DESCRIPTION OF THE DRAWINGS

The present disclosure is illustrated by way of example and not limited in the accompanying figures in which like reference numerals indicate similar elements and in which.

DETAILED DESCRIPTION

An electronic TRV (Thermostatic Radiator Valve) is often used with a heating radiator of a heating, ventilation, and air conditioning (HVAC) system for the control of the room temperature by adjusting the flow of hot water to the radiator based on a user desired temperature set point. According to traditional approaches, an electronic TRV has a liquid-crystal display (LCD) for displaying the temperature set point and other TRV information with a fixed display orientation when a user is configuring the set point adjustment. However, there may be different positions of the TRV connection port on the radiator depending on the type of the radiator and the installation location. This variability may result in a different display orientation of the electronic TRV for each installation. Consequently, the user may have difficulty reading TRV information on the liquid-crystal display when the display is in a fixed position.

According to one aspect of the disclosure, the liquid-crystal display is configurable to display TRV information for a desired viewing direction to facilitate reading by a user.

Figure 1:
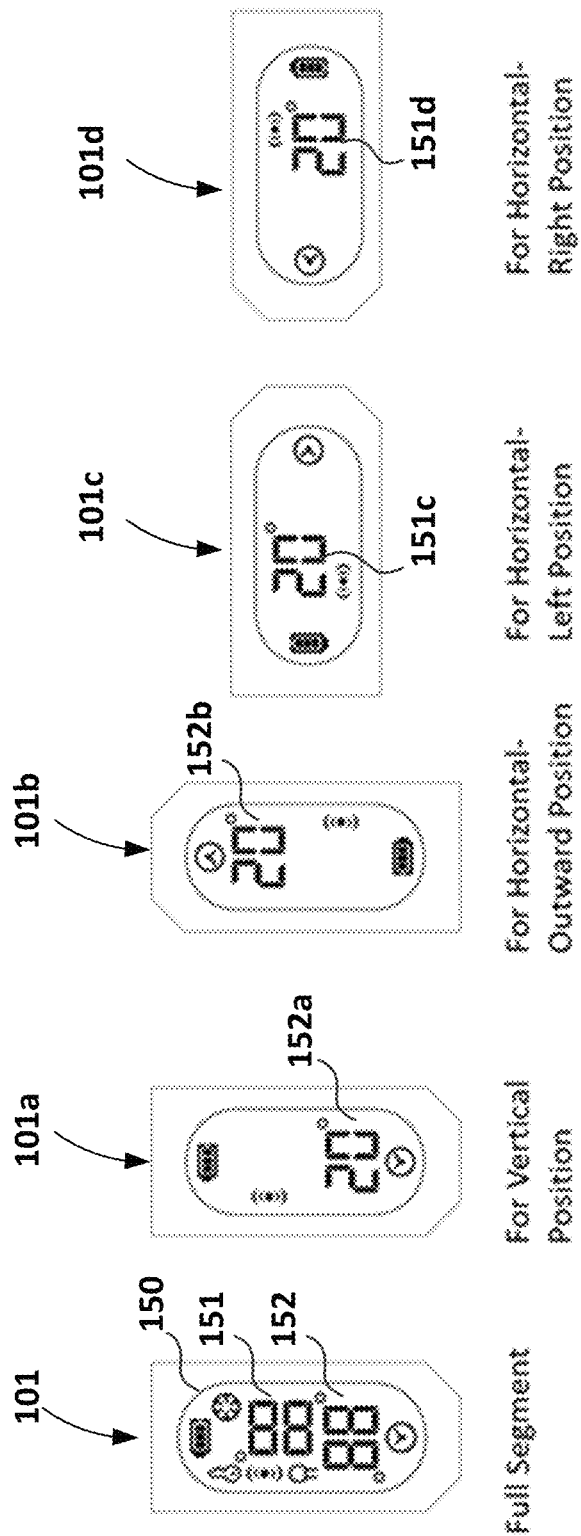
FIG. 1 shows a display for a thermostatic radiator valve (TRV) that is configurable for different viewing orientations according to one or more aspects of the disclosure.
Figure 2:
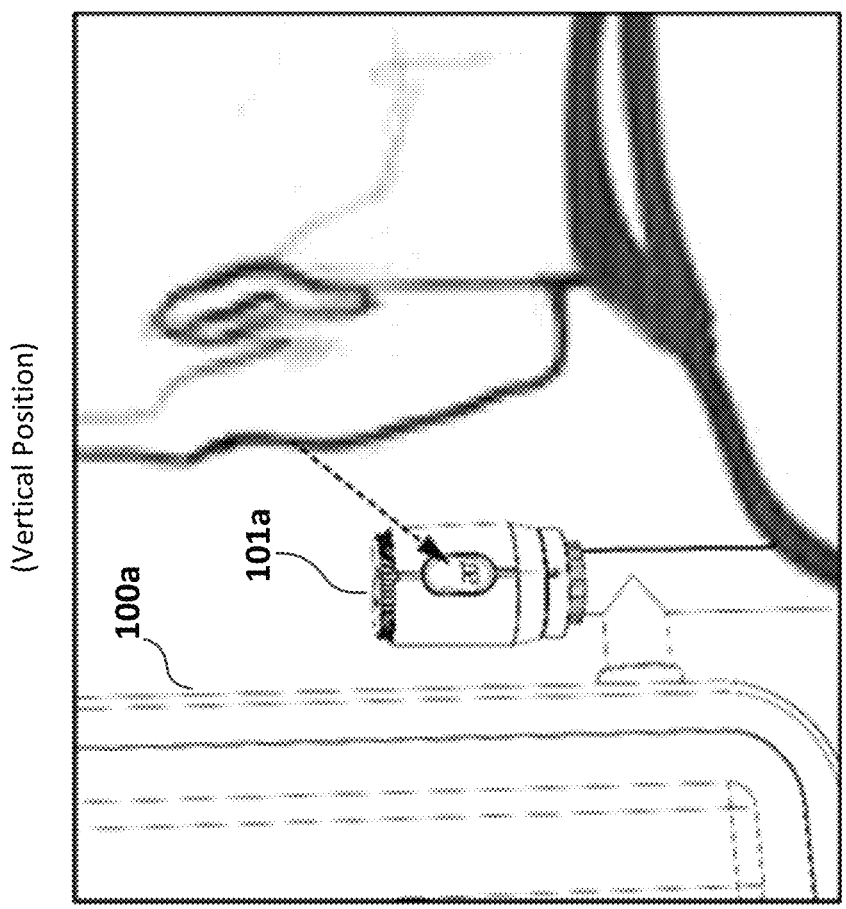
FIG. 2 shows a thermostatic radiator valve (TRV), where the display is configured for a vertical orientation according to one or more aspects of the disclosure.
Figure 3:
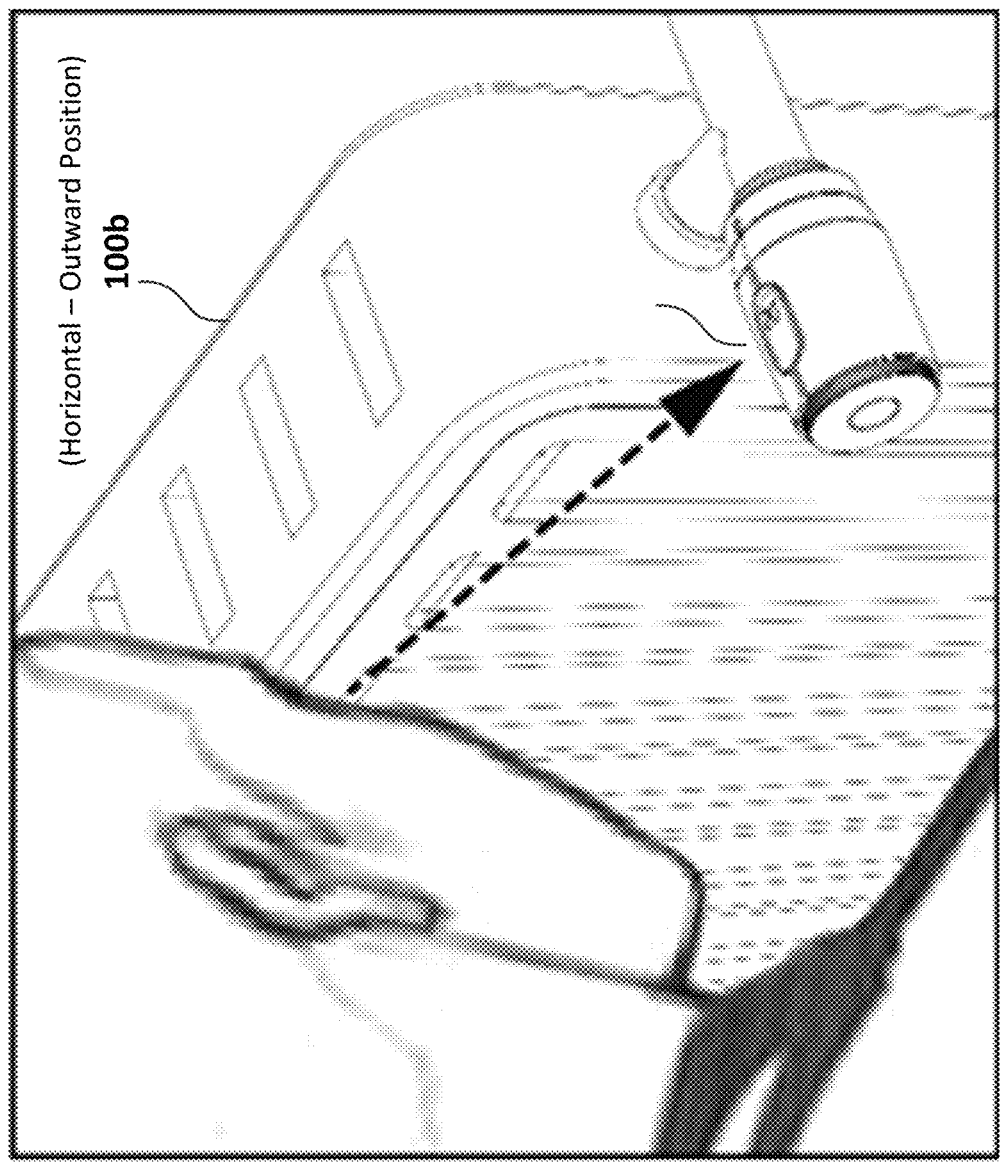
FIG. 3 shows a thermostatic radiator valve (TRV), where the display is configured for a horizontal-outward orientation according to one or more aspects of the disclosure.
Figure 4:
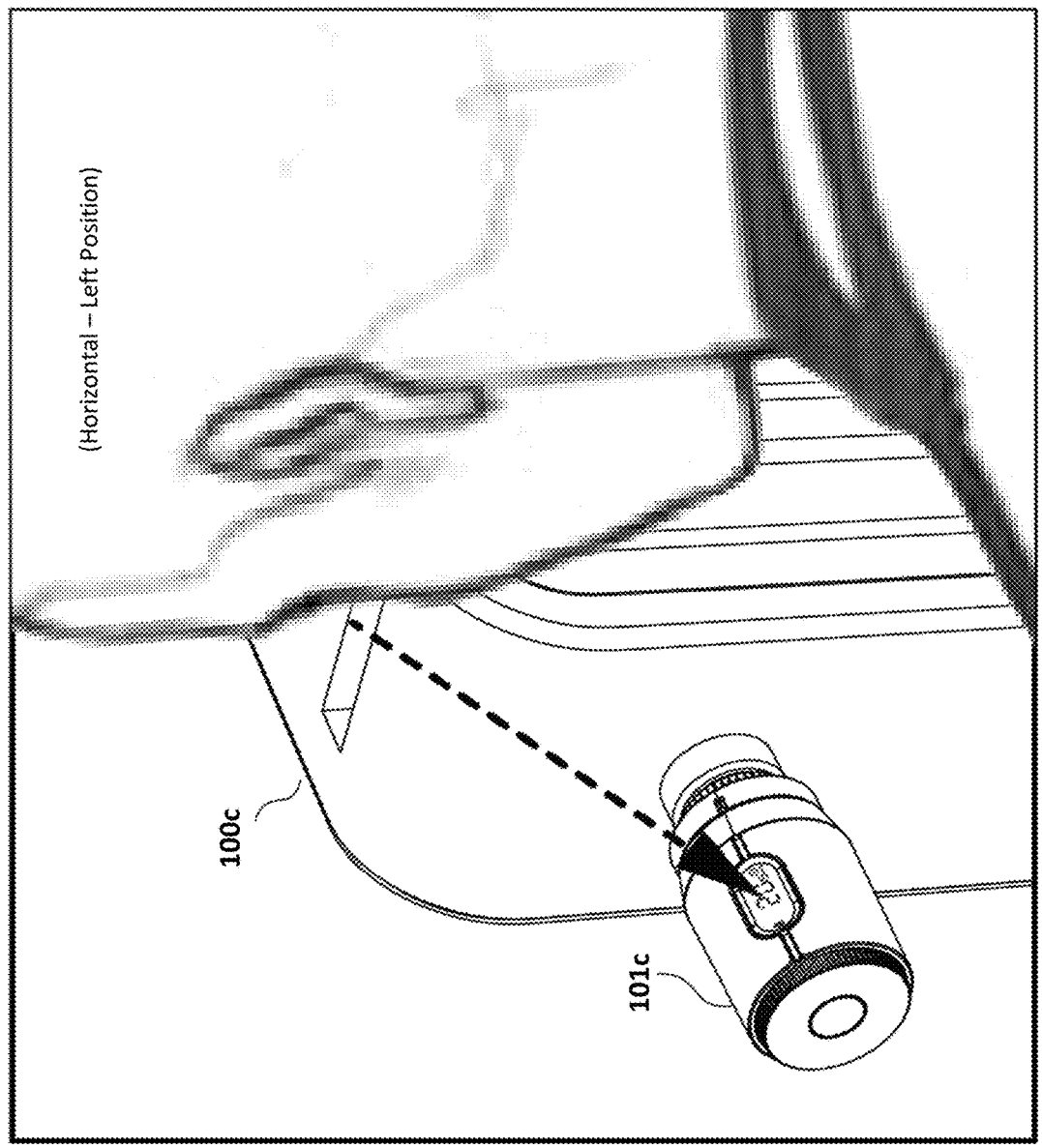
FIG. 4 shows a thermostatic radiator valve (TRV), where the display is configured for a horizontal-left orientation according to one or more aspects of the disclosure.
Figure 5:
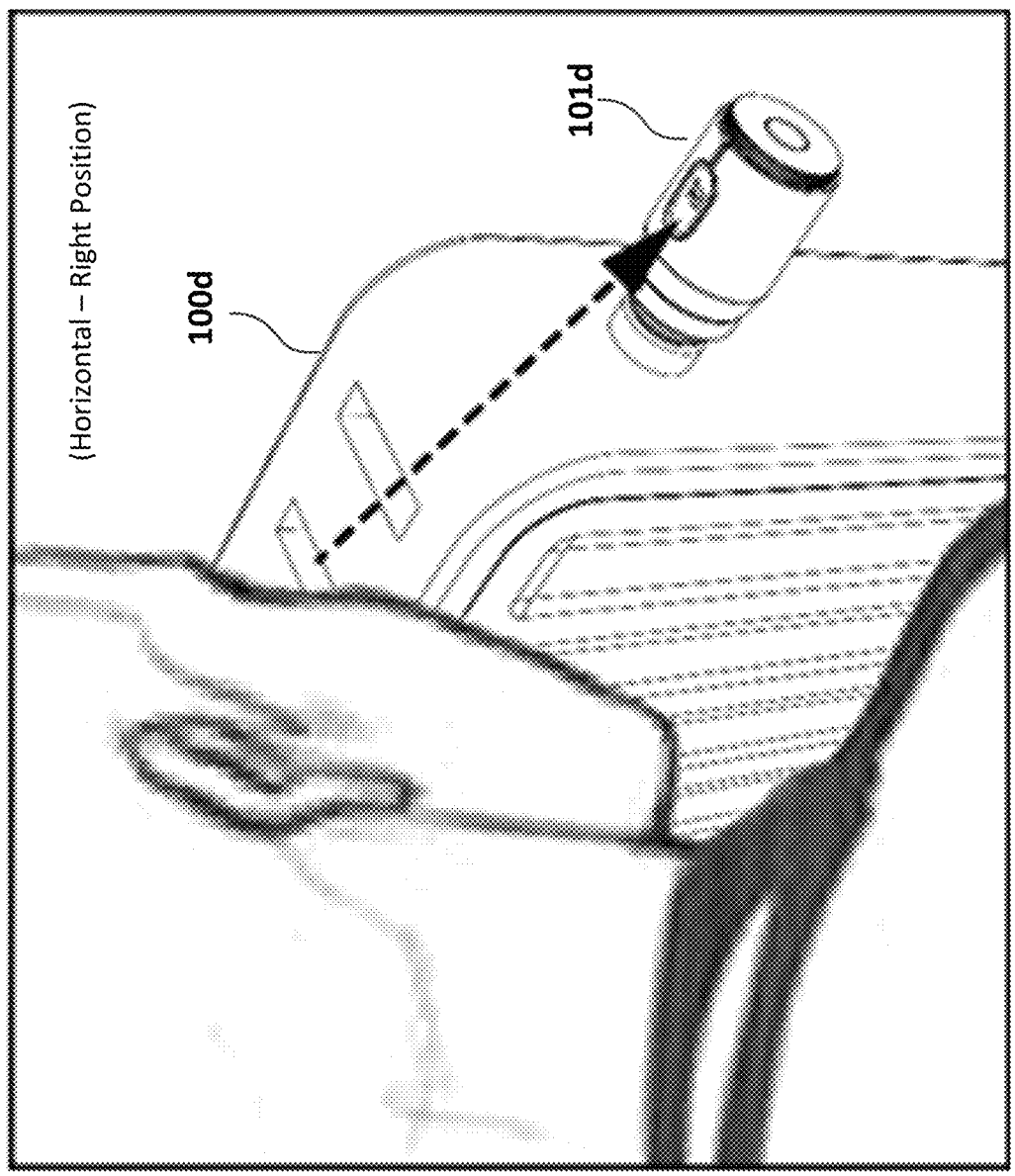
FIG. 5 shows a thermostatic radiator valve (TRV), where the display is configured for a horizontal-right orientation according to one or more aspects of the disclosure.

FIG. 1 shows a display for a thermostatic radiator valve (TRV) 101 that is configurable for different viewing orientations 101a, 101b, 101c, and 101d according to one or more aspects of the disclosure.

Thermostatic radiator valve 101 includes display 150, which may be configured to support one of four display orientations: a vertical direction, a horizontal-outward position, a horizontal-left position, and a horizontal-right position corresponding to thermostatic radiator valves 101a, 101b, 101c, and 101d, respectively, and shown in FIGS. 2, 3, 4, and 5, respectively.

Display 150 may support different types of display technologies. For example, display 150 may comprise a seven-segment liquid-crystal display (LCD) or a seven-segment light-emitting diode (LED) display. With seven segments, as shown in FIG. 1, display 150 may display digits and various characters. However, embodiments may support display elements with more segments (for example, fourteen) in order to obtain a greater degree of resolution and the capability of supporting a greater number of different characters.

Embodiments may also support display devices that are organized in a two-dimensional array (corresponding to a dot matrix display). A dot matrix display may be manufactured in various dimensions, where electrical components (for example, LED's) are arranged in a matrix pattern, Display 150 (for example, a liquid-crystal display (LCD) or a light-emitting diode (LED) display) supports a plurality of display sets including first set 151 of seven-segment elements in a first direction and second set 152 of seven-segment elements in a second direction. Typically, only one set is activated at a particular time so that LCD 150 displays TRV information only one direction.

Thermostatic regulator valve 101 enables the user to choose the display orientation after completion of installation so that the user can have a proper viewing direction of display 150 as shown in installation scenarios at FIGS. 2-5.

Figure 6:
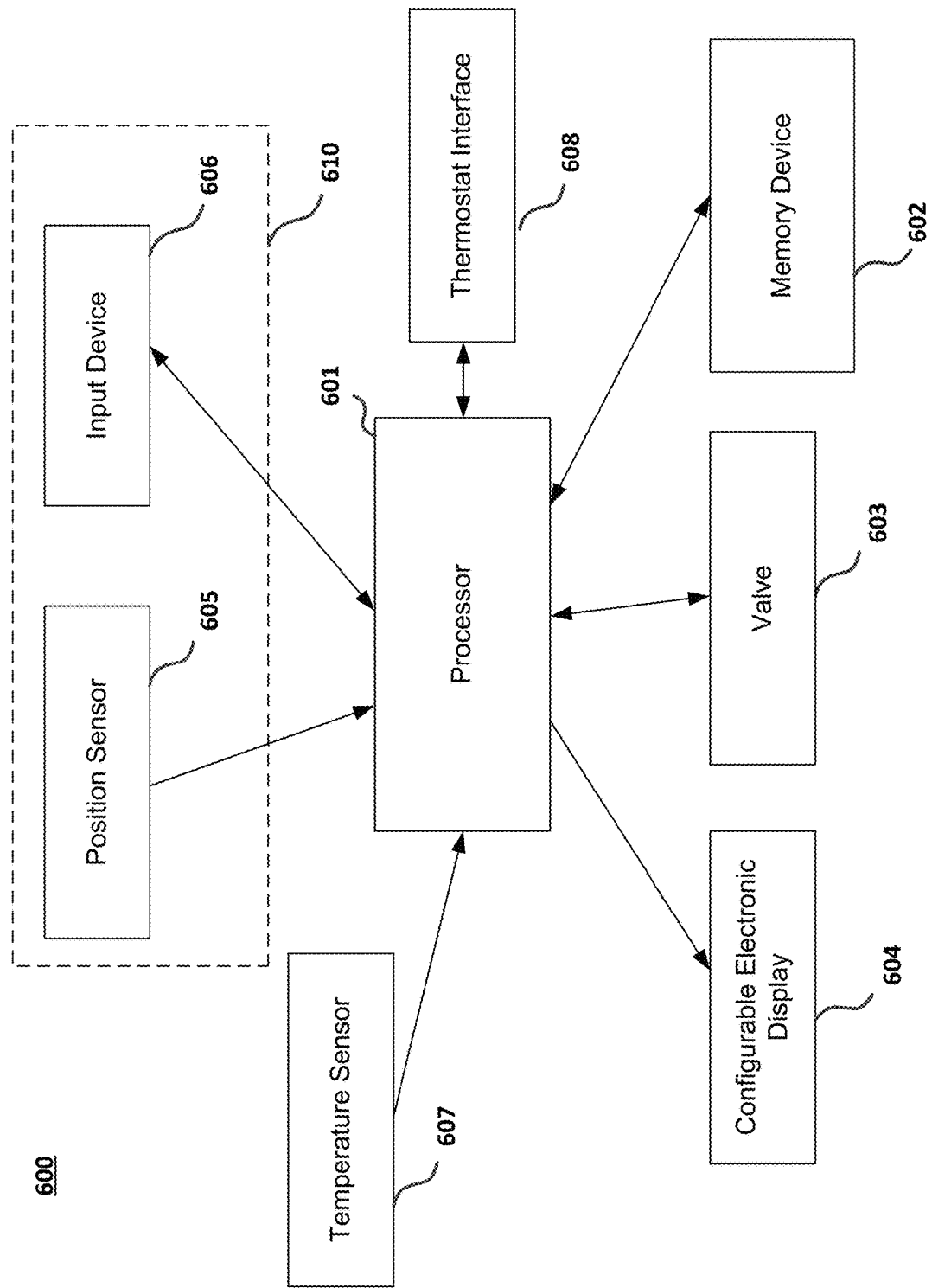
FIG. 6 shows a thermostatic radiator valve (TRV) comprising a computing device according to one or more aspects of the disclosure.

FIG. 6 shows a thermostatic radiator valve 600 according to one or more aspects of the disclosure.

Thermostatic radiator valve 600 may include computing device 601, where the processes (for example, process 700 shown in FIG. 7) discussed herein may be implemented. Computing device 601 may execute computer-executable instructions accessed from computer readable media, for example, from memory device 602. By way of example, and not limitation, computer readable media may comprise a combination of computer storage media and communication media.

Computer storage media may include volatile and non-volatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Processor 601 processes TRV data from temperature sensor 607 (which may include the measured temperature of water flowing through valve 603), thermostat interface 608 (which may include the temperature set point inputted by a user through a thermostat), and configuration circuit 610 (which may provide display configuration information).

Based on TRV data, processor 601 controls valve 603 to regulate heated/cooled water through a radiator of the HVAC system.

Embodiments may support one of different approaches for determining a desired display orientation. For example, embodiments may use a manual selection or an auto sensor detection.

Configuration circuit 610 may include position sensor 605 to detect an installation position of thermostatic regulator valve (TRV) 600 and/or input interface 606 to obtain user information about a desired orientation of configurable electronic display 604.

With some embodiments, position sensor 605 may include an accelerometer (for example, a 3-axis position sensor) that detects a gravitation force along two directional axes (for example, corresponding to horizontal and vertical directions).

With some embodiments, position sensor 605 may include an accelerometer and a gyroscope (a 6-axis position sensor) that detects the position of the TRV, for example, the angular position of the TRV in horizontal direction.

With some embodiments, input interface 606 may interface with an electrical switch and/or push button so that a user can enter a desired display orientation. For example, the user may sequence through different display orientations and stop at the desired display orientation.

With some embodiments, input interface 606 may interface with a wireless communication module in the device which is connected to a smart home system, so that a user can select a desired display orientation on a remote user interface, such as a mobile app.

Once the desired display orientation is determined (for example, vertical direction, a horizontal-outward position, a horizontal-left position, and a horizontal-right position), processor 601 may configure configurable electronic display 604 by applying appropriate signals to electrical pins of display 604. For example, when supporting four possible display orientations, processor 601 may provide appropriate voltage values to two electrical pins in order to select one of the four possible display orientations.

Once electronic display 604 is configured, processor 601 may instruct display 604 to display TRV information through a set of electrical pins to activate the necessary segments or dots of a display matrix.

Figure 7:
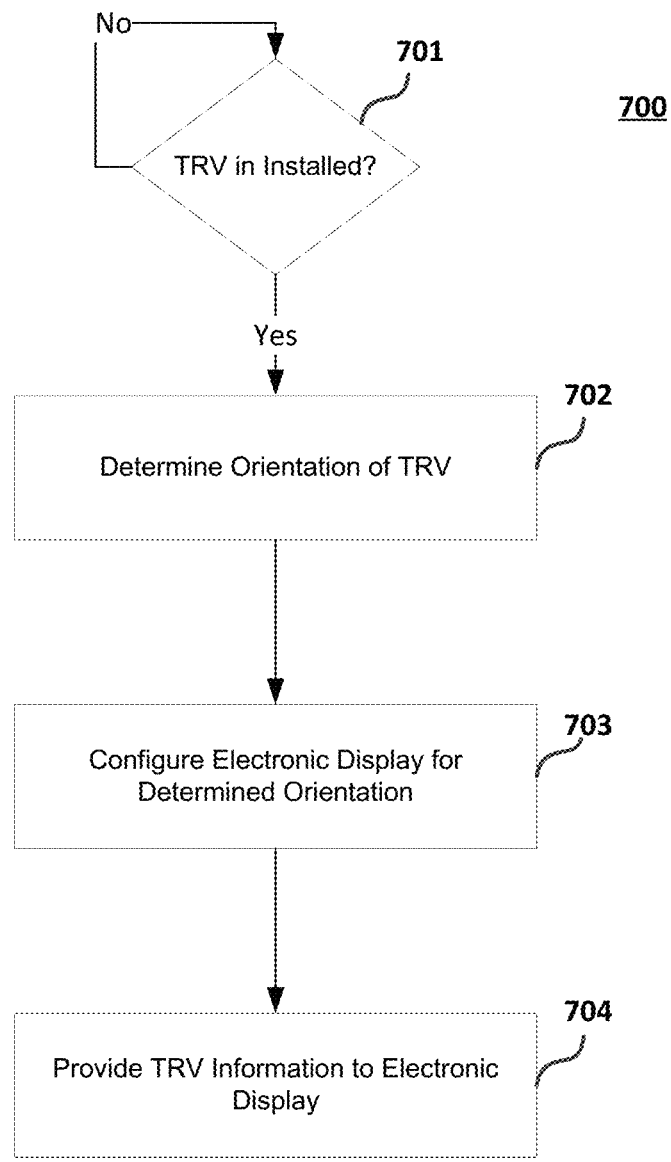
FIG. 7 shows a process that may be executed by a computing device to support a thermostatic radiator valve (TRV) according to one or more aspects of the disclosure.

FIG. 7 shows process 700 that may be executed by computing device 601 (as shown in FIG. 6) to support thermostatic radiator valve 600.

At block 701, process determines whether thermostatic radiator valve 600 has been installed. For example, installation information (for example, a switch setting) indicative of installation completion may be entered through input device 606 or the detected positioning from position sensor 605 is unchanged for at least a predetermined amount of time.

Once installed, thermostatic radiator valve 600 determines the desired display orientation at block 702. For example, position sensor 605 may provide the position information to select one of four possible display orientations.

At block 703, processor 601 configures electronic display 604 according to the determined desired display orientation.

After configuring electronic display 604, processor 601 instructs display 604 to display TRV information (for example, temperature set point) at block 704.

Figure 8:
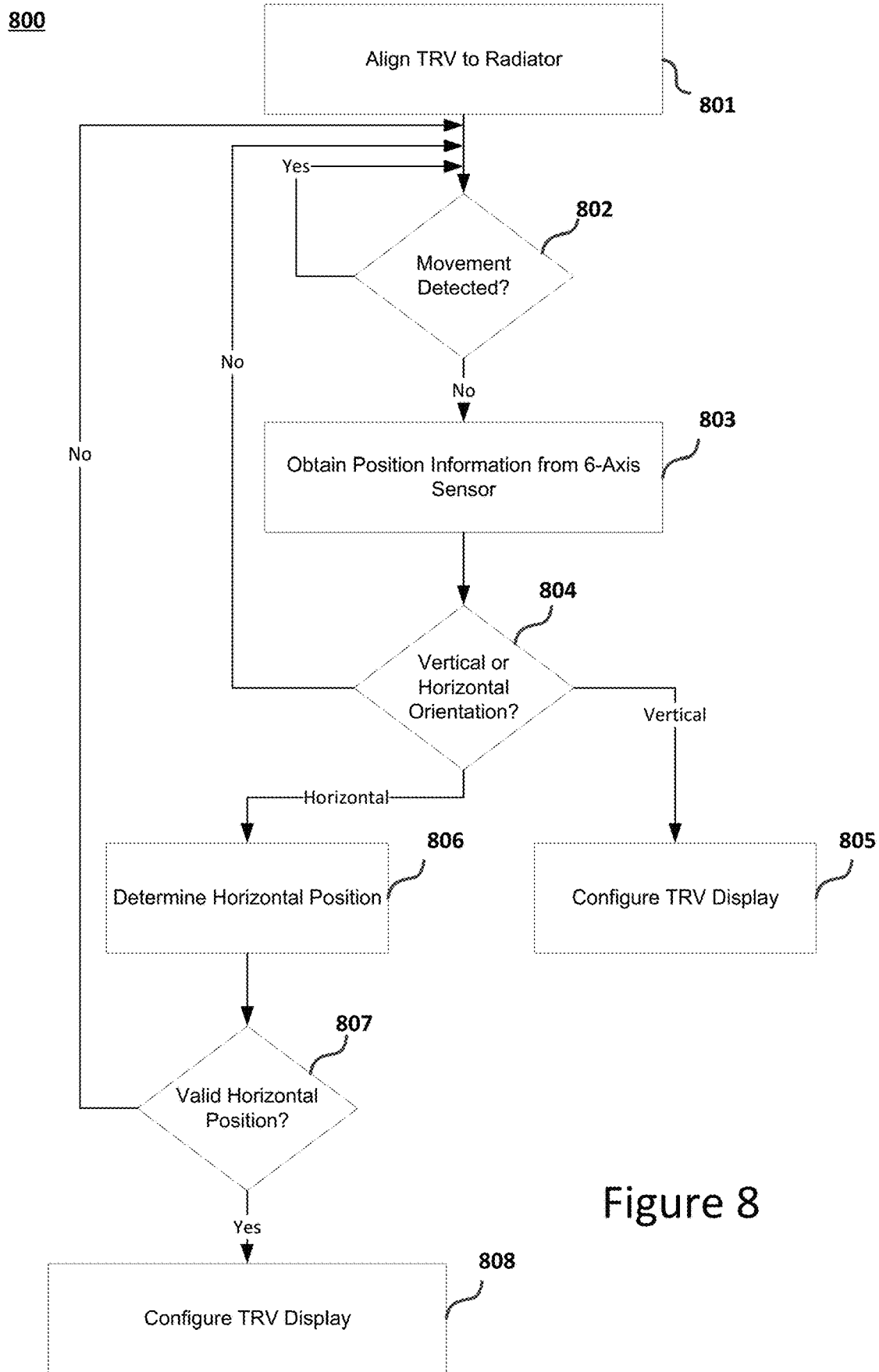
FIG. 8 shows a process that may be executed by a computing device to support a thermostatic radiator valve (TRV) according to one or more aspects of the disclosure.

FIG. 8 shows process 800 that may be executed by computing device 601 to support thermostatic radiator valve (TRV) 600, where position sensor 605 comprises a 6-axis sensor. For example, the 6-axis sensor may comprise a 3-axis accelerometer (providing X-Y-Z position information) and a 3-axis gyroscope (providing angular information about the X-Y-Z axes such as roll, pitch, and yaw).

As will be discussed in further detail, TRV 600 determines its position with respect to radiator 100*a,b,c,d* (as shown in FIGS. 2-5, respectively). Based on its relative position, TRV 600 configures it's displays as shown in FIGS. 2-5.

At block 801 process TRV 600 is aligned to the associated radiator (for example, the front) since the radiator may be oriented differently (for example, along any of the walls or at an angle to the walls) in a space such as a room. With some embodiments, TRV 600 may have an electrical switch that is activated when TRV 600 is pushed against a designated surface of the radiator (for example, the front). Alternatively, TRV 600 may obtain the position data from sensor 605, for instance after a pre-defined position threshold is triggered.

With some embodiments, a default position of position sensor 605 with respect to TRV 600 is calibrated during manufacturing. When TRV 600 is removed from the shipping container, processor 601 may obtain position readings from sensor 605 and compute the current position.

At block 802, process 800 determines whether TRV 600 has been installed by detecting whether TRV 600 has had any movement over a predetermined time duration. If not, process 800 deems that TRV 600 has been installed to the radiator. However. embodiments may use other approaches to determine whether installation has been completed. For example, installation information (for example, a switch setting) indicative of installation completion may be entered through input device 606 or by the detecting water flow through valve 603.

When the completion of installation has been detected, TRV 600 obtains position information about the installed position of TRV 600 from the 6-axis sensor at block 803.

Alternatively, the position sensor 605 continuously detects the position of the TRV and adjusts the display when a pre-defined threshold is triggered.

At block 804, process 800 determines whether TRV 600 is in a vertical orientation or a horizontal orientation from the X-Y-Z position information. If TRV 600 is in the vertical orientation, process 600 at block 805 configures display 604 as per configuration 101*a* as shown in FIG. 1. However, if TRV 600 is not in the horizontal or vertical orientation (for example, somewhere in between), process 800 may return back to block 802 since installation may not have been completed and subsequent movement of TRV 600 may be detected.

If process 800 determines that TRV 600 is installed in the horizontal orientation, process 800 at block 806 determines whether TRV 600 is installed in a horizontal-outward position, a horizontal-left position, or a horizontal-right position. With some embodiments, process 800 utilizes angular information (for example, the yaw corresponding to rotation movement about the vertical axis). However, if process 800 at block 807 detects a horizontal position that is not supported (for example, somewhere between the horizontal-outward position and the horizontal-left position), process 800 may return back to block 802 since installation may not have been completed and subsequent movement of TRV 600 may be detected.

If the determined horizontal position is valid, process 800 at block 808 configures display 604 for the corresponding configuration (configuration 101*b*, 101*c*, or 101*d* as shown in FIG. 1).

Figure 9A:
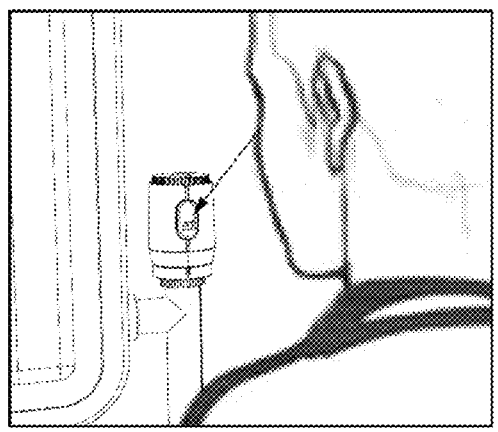
FIGS. 9A-D show examples of the viewing flexibility supported by a thermostatic radiator valve (TRV) according to one or more aspects of the disclosure.
Figure 9A:
Figure 9A:
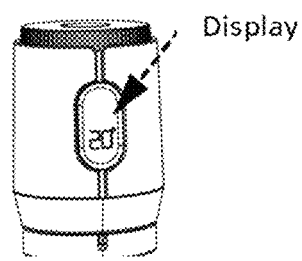

FIG. 9A shows TRV 600 installed in the vertical position.

Figure 9B:
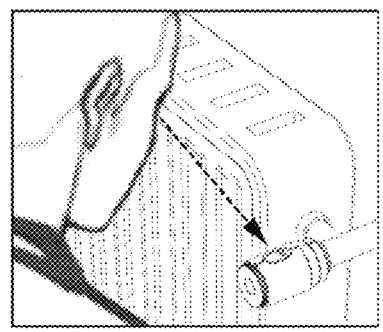
Figure 9B:
Figure 9B:
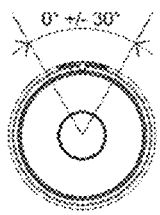
Figure 9C:
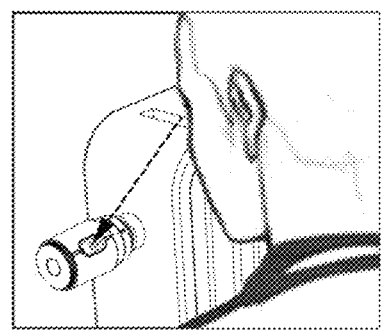
Figure 9C:
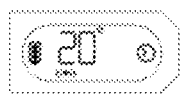
Figure 9C:
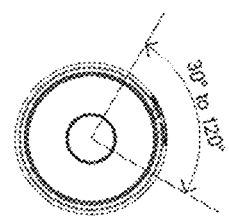
Figure 9D:
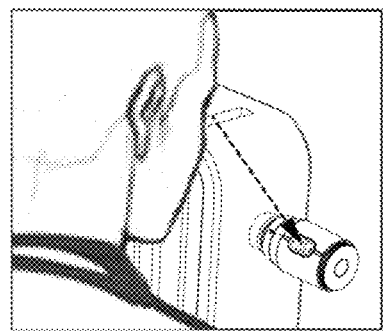
Figure 9D:
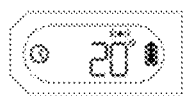
Figure 9D:
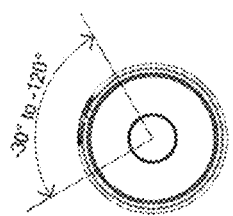

When setting up TRV 600 in the horizontal position, a processor 601 may detect three different zones for horizontal orientations. For example: −30° to +30°, 30° to 120°, −30° to −120° are shown in FIGS. 9B, 9C, and 9D.

While the embodiment shown in FIGS. 2-5 show four display orientations (a vertical direction, a horizontal-outward position, a horizontal-left position, and a horizontal-right position) some embodiments may support other display orientations, for example, a horizontal-inward position, a vertical-up position, and/or vertical-down position.

Exemplary Clauses

1. A thermostatic radiator valve (TRV) for controlling a heating, ventilation, and air conditioning (HVAC) system, the thermostatic radiator valve comprising:
    a configurable electronic display capable of displaying TRV information in one of a plurality of display orientations;
    a configuration circuit capable of determining a desired display orientation from the plurality of orientations and generating a display indicator indicative of the desired display orientation; and
    a processing device capable of receiving the display indicator and configuring the configurable electronic display to display the TRV information in the desired display orientation.
2. The thermostatic radiator valve of clause 1, wherein the plurality of display orientations comprises a vertical position, a horizontal-outward position, a horizontal-left position, and a horizontal-right position.
3. The thermostatic radiator valve of clause 1, wherein the configurable electronic display comprises a first set of display elements in a first direction and a second set of display elements in a second direction.
4. The thermostatic radiator valve of clause 3, wherein each of the display elements comprises seven segments.
5. The thermostatic radiator valve of clause 3, wherein each of the display elements comprises fourteen segments.
6. The thermostatic radiator valve of clause 3, wherein the first direction is perpendicular to the second direction.
7. The thermostatic radiator valve of clause 3, wherein the configurable electronic display comprises a liquid-crystal display (LCD).
8. The thermostatic radiator valve of clause 3, wherein the configurable electronic display comprises a plurality of light emitting diodes (LED's).
9. The thermostatic radiator valve of clause 1, wherein the configuration circuit comprises at least one sensor capable of detecting a positioning of the thermostatic radiator valve and determining the desired display orientation from the detected positioning.
10. The thermostatic radiator valve of clause 9, wherein the at least one sensor includes an accelerometer.
11. The thermostatic radiator valve of clause 9, wherein the configuration circuit waits at least a predetermined amount of time while positioning information from the at least one sensor is unchanged before determining the desired display orientation.
12. The thermostatic radiator valve of clause 9, wherein the configuration circuit continuously tracks the position information from at least one sensor and determines the desired display orientation when the corresponding threshold is passed.
13. The thermostatic radiator valve of clause 9, wherein the TRV is installed with an inclined position to avoid the ambiguity of the location of the TRV with respective to a user.
14. The thermostatic radiator valve of clause 9, wherein a user is able to rotate the TRV to horizontal position once the installation is completed.
15. The thermostatic radiator valve of clause 9, wherein a user installs the TRV horizontally to the radiator, wherein the orientation of the LCD is determined by the inclined position of the TRV prior to the horizontal position, for example, setup the LCD orientation and then install the TRV to the radiator.
16. The thermostatic radiator valve of clause 9, wherein a user installs the TRV horizontally to the radiator and the orientation of the LCD is divided into three different zones depending on the angular rotation angle.
17. The thermostatic radiator valve of clause 1, wherein the configuration circuit comprises an input device capable of providing input information and determining the desired display orientation from the input information.
18. The thermostatic radiator valve of clause 16, wherein the input information is indicative is indicative of a completion of installation.
19. The thermostatic radiator valve of clause 1, wherein the configurable electronic display comprises a plurality of display elements organized in a matrix configuration.
20. The thermostatic radiator valve of clause 9, wherein the at least one sensor includes a 6-axis sensor and wherein the 6-axis sensor comprises a 3-axis accelerometer and a 3-axis gyroscope.
21. The thermostatic radiator valve of clause 20, wherein the configuration circuit is configured to obtain X-Y-Z position information from the 3-axis accelerometer and is configured to determine whether the thermostatic radiator valve is installed in a vertical orientation or in a horizontal orientation from the X-Y-Z position information.
22. The thermostatic radiator valve of clause 21, wherein the configuration circuit is configured to obtain angular position information from the 3-axis gyroscope and is configured to determine the horizontal position from the angular position information when the thermostatic radiator valve in installed in the horizontal orientation.

Aspects of the invention have been described in terms of illustrative embodiments thereof. Numerous other embodiments, modifications and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A thermostatic radiator valve (TRV) for controlling a heating, ventilation, and air conditioning (HVAC) system, the thermostatic radiator valve comprising:
a configurable electronic display capable of displaying TRV information in a plurality of display orientations within the configurable electronic display;
a configuration circuit capable of:
detecting that the thermostatic radiator valve has been installed,
determining, based on the detecting and from a plurality of possible TRV positions relative to a designated surface of the HVAC system, a TRV position relative to the designated surface of the HVAC system, and generating an indication of the TRV position; and
a processing device capable of receiving the indication and configuring the configurable electronic display to display the TRV information in a desired display orientation, of the plurality of display orientations, based on the indication.

2. The thermostatic radiator valve of claim 1, wherein the configuration circuit comprises an input interface and is configured to receive position information of the thermostatic radiator valve via the input interface.

3. The thermostatic radiator valve of claim 2, wherein the position information is received via the input interface from a remote wireless device executing a mobile app.

4. The thermostatic radiator valve of claim 1, wherein the configuration circuit comprises a position sensor capable of obtaining position information of the thermostatic radiator valve.

5. The thermostatic radiator valve of claim 4, wherein the position sensor supports 6 axes and comprises a 3-axis accelerometer and a 3-axis gyroscope.

6. The thermostatic radiator valve of claim 5, wherein the configuration circuit is configured to obtain X-Y-Z position information from the 3-axis accelerometer and is configured to determine whether the thermostatic radiator valve is installed in a vertical orientation or in a horizontal orientation from the X-Y-Z position information.

7. The thermostatic radiator valve of claim 5, wherein the configuration circuit is configured to obtain angular position information from the 3-axis gyroscope and is configured to determine a horizontal position from the angular position information when the thermostatic radiator valve in installed in a horizontal orientation.

8. The thermostatic radiator valve of claim 4, wherein the configuration circuit is configured to detect, based on a lack of movement of the thermostatic radiator valve having been detected via the position sensor, that the thermostatic radiator valve has been installed.

9. The thermostatic radiator valve of claim 4, wherein the configuration circuit is configured to:
continuously track the position information from the position sensor, and
determine, based on the position information satisfying a position threshold, the TRV position.

10. The thermostatic radiator valve of claim 4, wherein the configurable electronic display comprises a first set of display elements in a first direction and a second set of display elements in a second direction.

11. The thermostatic radiator valve of claim 10, wherein the first direction is perpendicular to the second direction.

12. The thermostatic radiator valve of claim 10, wherein the configuration circuit is configured to wait at least a predetermined amount of time while the position information from the position sensor is unchanged before determining the desired display orientation.

13. The thermostatic radiator valve of claim 1, further comprising an electrical switch capable of being activated when pushed against the designated surface of the HVAC system.

14. The thermostatic radiator valve of claim 1, wherein the configuration circuit is configured to detect, based on a water flow through the thermostatic radiator valve being detected, that the thermostatic radiator valve has been installed.

15. The thermostatic radiator valve of claim 1, further comprising an input device, wherein the input device is configured to provide an input signal, to the configuration circuit, that is indicative of an installation status.

16. The thermostatic radiator valve of claim 1, wherein the configuration circuit is configured to, based on determining that the TRV position is invalid wait for the thermostatic radiator valve to be installed.

17. The thermostatic radiator valve of claim 1, wherein the thermostatic radiator valve is rotatable to a horizontal position when installation of the thermostatic radiator valve is completed.

18. The thermostatic radiator valve of claim 1, wherein the plurality of display orientations comprises a vertical position, a horizontal-outward position, a horizontal-left position, and a horizontal-right position.

19. A method for controlling a heating, ventilation, and air conditioning (HVAC) system by a thermostatic radiator valve, the method comprising:
obtaining, from a position sensor, position information of the thermostatic radiator valve;
detecting that the thermostatic radiator valve has been installed;
determining, based on the detecting and from a plurality of possible TRV positions relative to a designated surface of the HVAC system, a TRV position with respect to the designated surface of the HVAC system;
generating an indication of the TRV position;
configuring a configurable electronic display, capable of displaying TRV information in a plurality of display orientations within the configurable electronic display, to display TRV information in a desired display orientation, of the plurality of display orientations, based on the indication; and
causing the configurable electronic display to display the TRV information in the desired display orientation based on the configuring.

20. The method of claim 19, wherein the position sensor comprises a 3-axis accelerometer, the method further comprising:
obtaining X-Y-Z position information from the 3-axis accelerometer; and
determining whether the thermostatic radiator valve is installed in a vertical orientation or in a horizontal orientation from the X-Y-Z position information.

21. The method of claim 20, wherein the position sensor further comprises a 3-axis gyroscope, the method further comprising:
obtaining angular position information from the 3-axis gyroscope; and
determining a horizontal position from the angular position information when the thermostatic radiator valve in installed in the horizontal orientation.

22. The method of claim 19, further comprising:
- detecting, based on a lack of movement of the thermostatic radiator valve having been detected via the position sensor, that the thermostatic radiator valve has been installed.

23. One or more non-transitory computer-readable media storing instructions that, when executed by a thermostatic radiator valve (TRV) comprising at least one processor, a communication interface, and memory, configure the thermostatic radiator valve to:
- obtain position information of the thermostatic radiator valve;
- detect that the thermostatic radiator valve has been installed;
- determine, based on the detecting that the thermostatic radiator valve has been installed and from a plurality of possible TRV positions relative to a designated surface of a heating, ventilation, and air conditioning (HVAC) system, a TRV position with respect to the designated surface of the HVAC system;
- generate an indication indicative of the TRV position;
- configure a configurable electronic display, capable of displaying TRV information in a plurality of display orientations within the configurable electronic display, to display the TRV information in a desired display orientation, of the plurality of display orientations, based on the indication; and
- causing the configurable electronic display to display the TRV information in the desired display orientation based on the configuring.

* * * * *